(12) United States Patent
Rutschmann

(10) Patent No.: US 6,357,410 B1
(45) Date of Patent: Mar. 19, 2002

(54) AIR INTAKE SYSTEM AND METHOD OF OPERATING AN ENGINE USING SAME

(75) Inventor: Erwin Rutschmann, Tiefenbronn (DE)

(73) Assignee: Dr. Ing. h.c.F. Porsche Aktiengesekkschaft, Stuttgart (DE)

( * ) Notice: Subject to any disclaimer, the term of this patent is extended or adjusted under 35 U.S.C. 154(b) by 0 days.

(21) Appl. No.: 09/488,826

(22) Filed: Jan. 21, 2000

(30) Foreign Application Priority Data

Jan. 27, 1999 (DE) ............................ 199 03 123

(51) Int. Cl.[7] .................................... F02B 27/02
(52) U.S. Cl. .................................... 123/184.21
(58) Field of Search ................ 123/184.55, 184.57

(56) References Cited

U.S. PATENT DOCUMENTS 4,890,586 A * 1/1990 Fujii et al. ............ 123/184.55
5,495,834 A * 3/1996 Rutschmann et al. .. 123/184.57

* cited by examiner

Primary Examiner—Henry C. Yuen
Assistant Examiner—Hyder Ali
(74) Attorney, Agent, or Firm—Crowell & Moring LLP

(57) ABSTRACT

An air intake system is provided on a multi-cylinder internal-combustion engine having opposed cylinder rows, and is equipped with a resonance chamber system. The resonance chamber system has outer and inner suction pipe sections, the inner suction pipe sections having movable slides, by means of which, as a function of parameters of the internal-combustion engine, long and short suction pipes can be implemented. The resonance chamber system has a single resonance container in which by means of the arrangement of the inner suction pipe sections and the adjustment of the slides, an efficient long-pipe and short-pipe operation, which optimizes the charging of the cylinders of the internal-combustion engine, can be implemented.

29 Claims, 4 Drawing Sheets

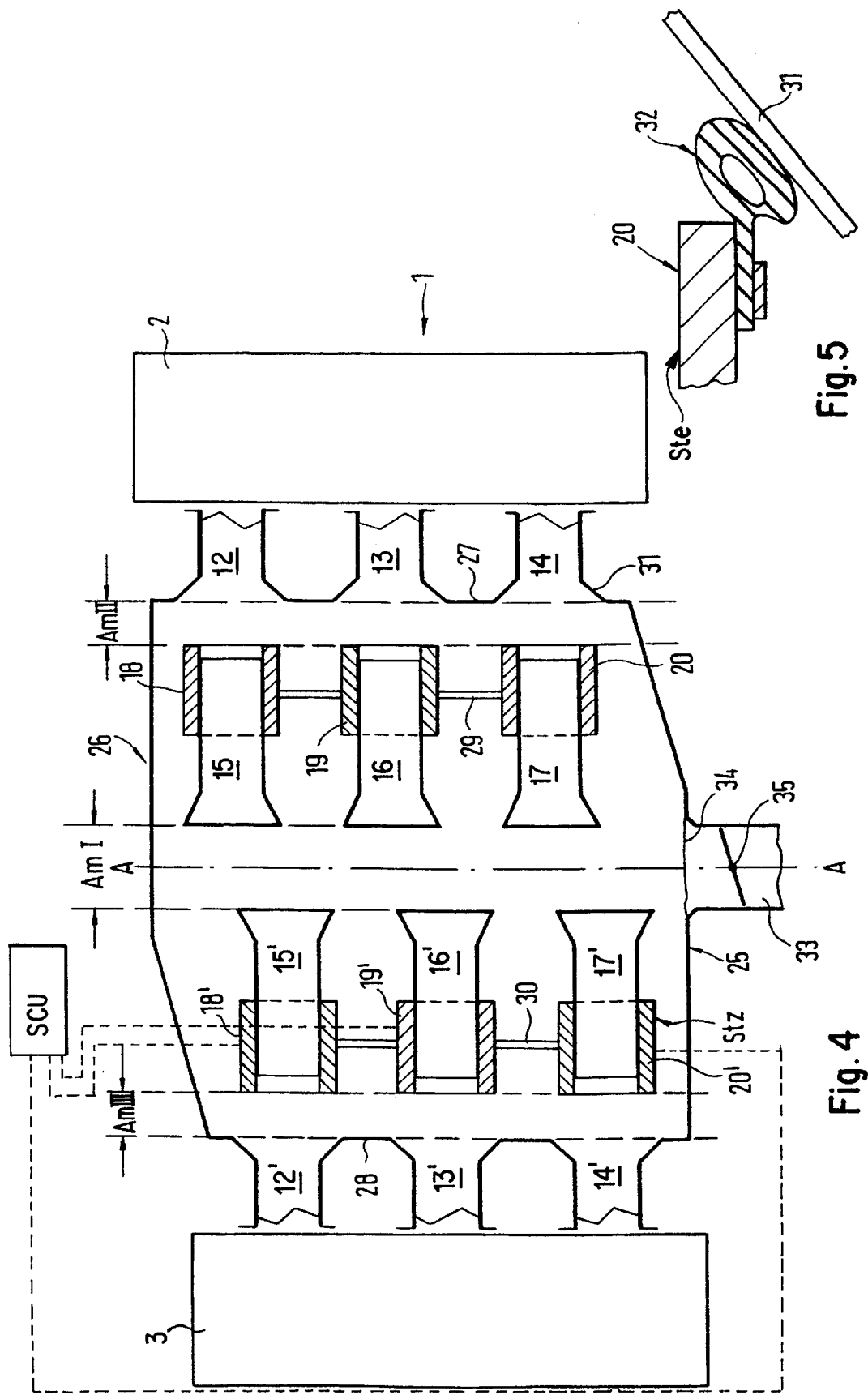

AIR INTAKE SYSTEM AND METHOD OF OPERATING AN ENGINE USING SAME

BACKGROUND AND SUMMARY OF THE INVENTION

This application claims the priority of German patent application no. 199 03 123.1, filed in Germany on Jan. 27, 1999, the disclosure of which is expressly incorporated by reference herein.

The invention relates to an air intake system of a multi-cylinder internal-combustion engine, having two opposed cylinder rows, a resonance chamber system being arranged between the cylinder rows which is connected by suction pipes to cylinders of the cylinder rows and connected by a feed pipe to an air filter, which resonance chamber system has first outer suction pipe sections and second inner suction pipe sections of the suction pipes, of which the inner suction pipe sections extend, on the one hand, by means of movable slides to the outer suction pipe sections and are directed by means of mouths to a longitudinal center plane between the suction pipes.

U.S. Pat. No. 3,783,845 describes an air intake system for an internal-combustion engine which has a container having suction pipe sections which are arranged therein diagonally to a horizontal line and whose end pieces project over one another.

German Patent Document DE 44 02 717 also shows an internal-combustion engine air intake system which has a ram pipe container separated from resonance containers. Suction pipe extension sections are provided in the resonance containers, the ends of the extension sections having sliding sleeves.

It is an object of the invention to provide an intake system for an internal-combustion engine which has a simple construction while the operation is good with an improvement of volumetric efficiency.

According to the invention, this object is achieved by providing an air intake system of the above discussed general type, wherein the resonance chamber system has a single resonance container which is connected with the first outer suction pipe sections and the second inner suction pipe sections, in which resonance container the second suction pipe sections for each cylinder row are arranged relatively movably with respect to the longitudinal center plane of the resonance container such that the second suction pipe sections operate by means of the slides in a first position in the long-pipe operation and in a second position in a short-pipe operation.

Principal advantages achieved by means of the invention are that the resonance chamber system comprises a single resonance container in which the ram pipe charging can be carried out by means of long suction pipes in the medium rotational speed range and the combined ram pipe—resonance charging can be carried out by means of short section pipes in the upper rotational speed range in an efficient manner. The components of this air intake system, that is, the resonance container and the first and second suction pipe sections, can be manufactured in a simple and easy manner with respect to their construction.

Furthermore, because of the compact construction, the space requirements of this air intake system are low.

Other objects, advantages and novel features of the present invention will become apparent from the following detailed description of the invention when considered in conjunction with the accompanying drawings.

BRIEF DESCRIPTION OF THE DRAWINGS

FIG. 4 is a view corresponding to FIG. 3;

FIG. 5 is an enlarged view of a detail X of FIG. 3.

DETAILED DESCRIPTION OF THE DRAWINGS

Figure 1:
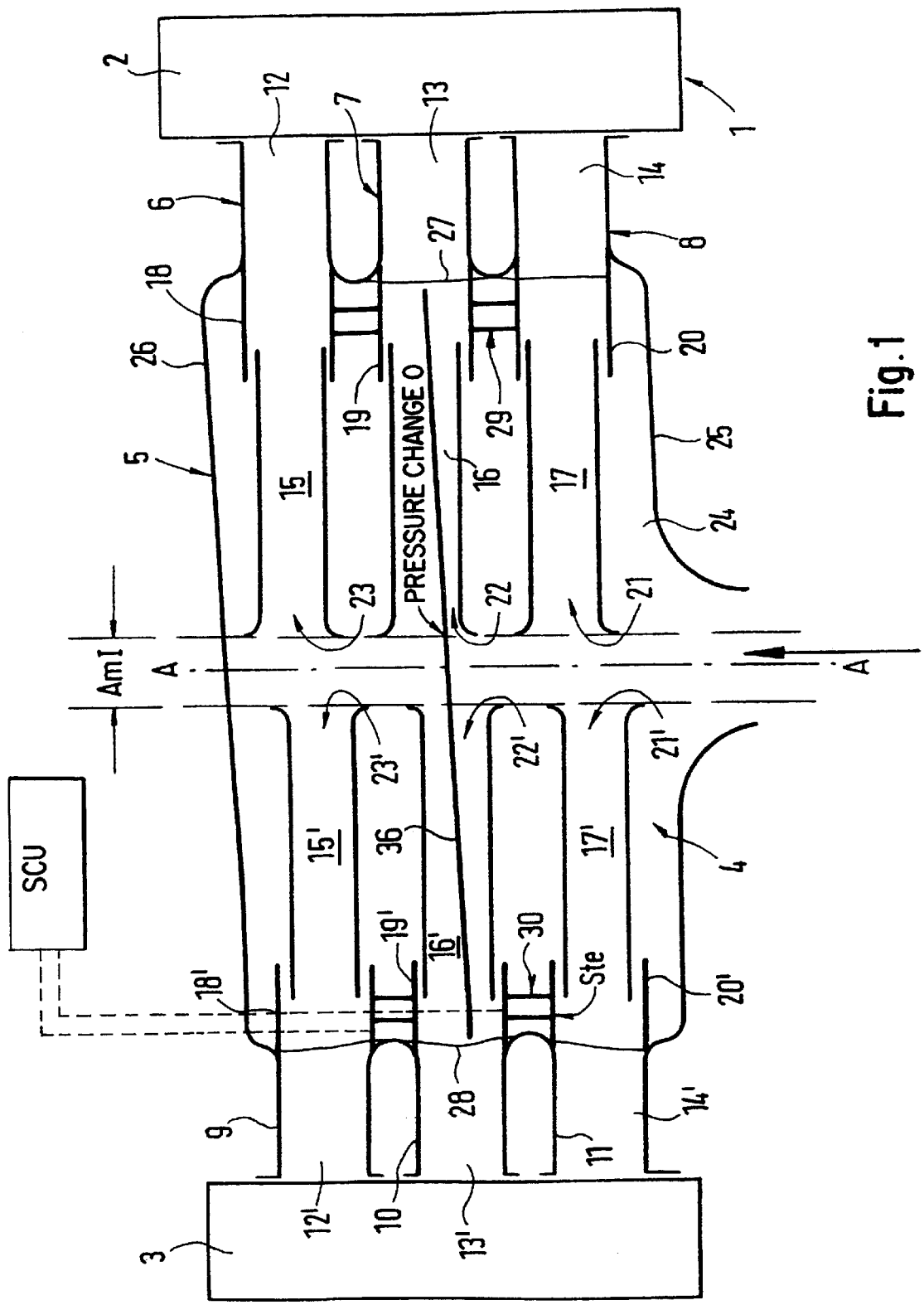
FIG. 1 is a schematic top view of an air intake system of an internal-combustion engine constructed according to preferred embodiment of the present invention.

A multi-cylinder internal-combustion engine 1 has an opposed cylinder construction and comprises opposed cylinder rows 2 and 3, between which an air intake system 4 is provided. The air intake system 4 is constructed as a resonance chamber system 5, and is connected by means of suction pipes 6, 7, 8 and 9, 10, 11 to cylinders of the cylinder rows 2 and 3.

The suction pipes 6, 7, 8 and 9, 10, 11 of the resonance chamber system 5 have first outer suction pipe sections 12, 13, 14 and 12', 13', 14' and second inner suction pipe sections 15, 16, 17 and 15';, 16', 17'. The second inner suction pipe sections 15, 16, 17 and 15', 16', 17' are connected, on the one hand, by means of movable slides 18, 19, 20 and 18', 19'20' with the first outer suction pipe sections 12, 13, 14 and 12', 13', 14'. On the other hand, mouths 21, 22, 23 and 21', 22', 23' of the second inner suction pipe sections, 15, 16, 17 and 15', 16', 17' are aligned with respect to a longitudinal center plane A—A which extends between the suction pipes 6, 7, 8 and 9, 10, 11. A schematically depicted slide control unit SCU is shown in each of FIGS. 1 and 4 for operating the movable slides.

The resonance chamber system 5 has a single resonance container 24 in which the slides 18, 19, 20 and 18', 19', 20' of the second inner suction pipe sections 15, 16, 17, and 15', 16', 17' for each cylinder row, such as 2, are arranged relatively movably such that the second inner suction pipe section 15, 16, 17 and 15', 16', 17' operate in a first position Ste in the long-pipe operation and in a second position Stz in the short-pipe operation. According to FIG. 1, the resonance container 24 has—viewed from above onto the internal-combustion engine 1—an approximately rectangular basic shape such that the second inner suction pipe sections 12, 13, 14 and 12', 13', 14' extend in the direction of longer sides 25, 26 of the resonance container 24; shorter sides 27, 28 of the resonance container 14 face the cylinder rows 2 and 3. The ratio of the rectangular basic shape; that is, shorter sides 27, 28 to longer sides 25, 26, in the illustrated embodiment, amounts to approximately 1:1.5 to 2.

Between the mutually facing mouths 21, 22, 23 and 21', 22', 23', a distance—distance measurement Aml—is provided, and the slides 18, 19, 20 and 18', 19', 20' of the second suction pipe sections 15, 16, 17 and 15', 16', 17' are in each case combined to a constructional unit 29 and 30, whereby the slides, for example, 18, 19, 20 of the constructional unit 29 can be operated jointly.

Figure 3:
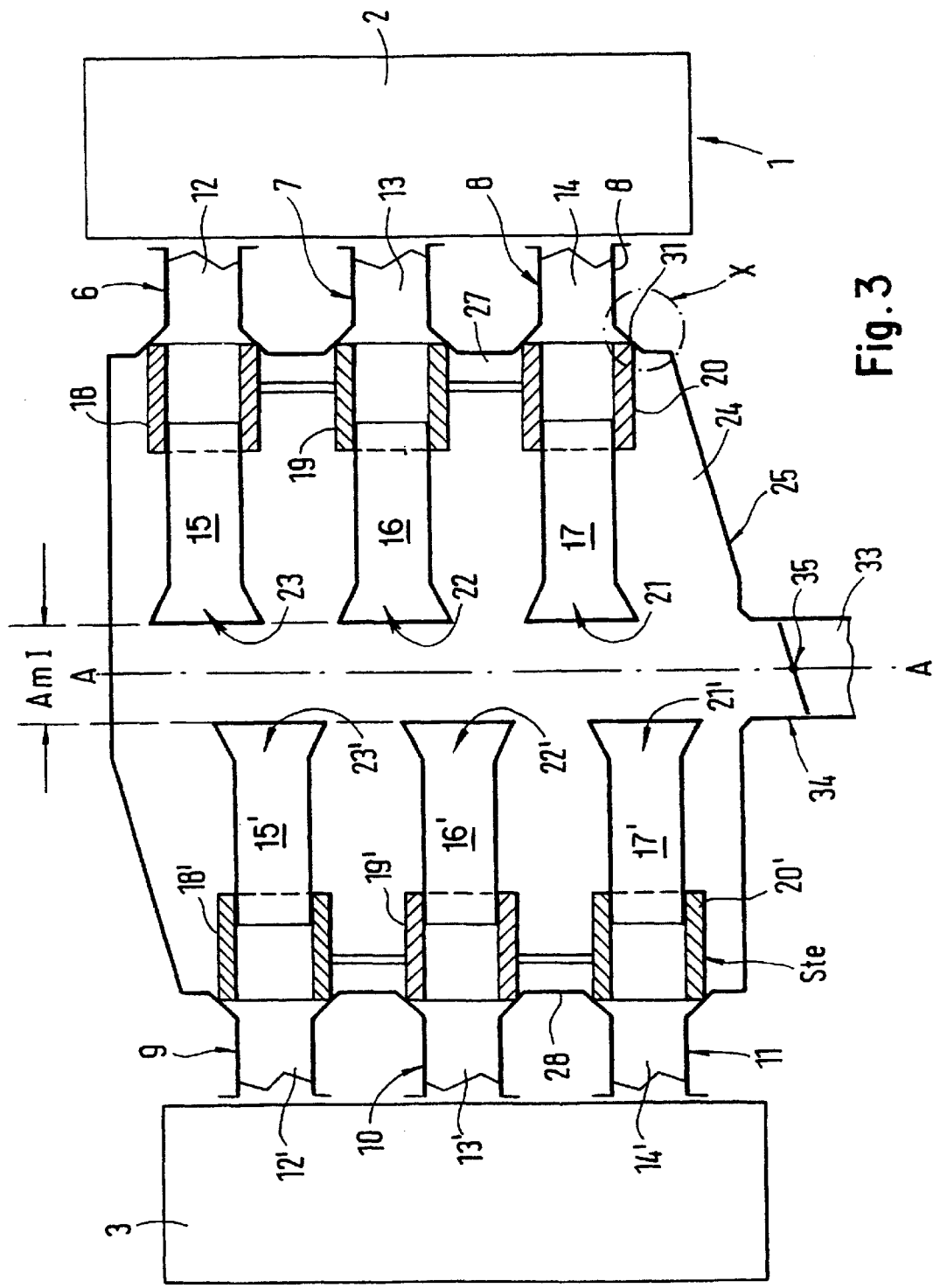
FIG. 3 is a view corresponding to FIG. 1 of a constructive solution of the air intake system.

In the first position Ste (FIGS. 1 and 3), the slides 18, 19, 20 and 18', 19', 20' connect the pertaining first suction pipe sections 15, 16, 17 and 15', 16', 17' with the respective second inner suction pipe sections 12, 13, 14 and 12', 13' and 14'. In contrast, in the second position Stz, a distance distance measurement Amll and Amlll (FIG. 4) respectively are provided between the above-mentioned slides and the abovementioned first and second suction pipe sections. In the first position Ste, the slides 18, 19, 20 and 18', 19', 20' rest in funnel-shaped receiving devices 31 of the second inner suction pipe sections 12, 13, 14 and 12', 13', 14', the slides 18, 19, 20 and 18', 19', 20' interacting by means of sealing bodies 32 with the receiving devices 31 (FIG. 5). The air intake system 4 is provided according to FIGS. 3 and 4 with an air inlet 34 constructed as a conduit 33, which air inlet 34 is connected with the longer side 25 of the resonance container 24. In the embodiment shown, the air inlet 34 extends coaxially with respect to the longitudinal center plane A—A of the resonance container 24. In the conduit 33 connected in front of the air inlet 34, a throttle valve 35 is arranged.

When the internal-combustion engine 1 with the described air intake system 4 is operated in the medium rotational speed range—to approximately 5,000 r.p.m.—, the first outer suction pipe sections and the second inner suction pipe sections form correspondingly long suction pipes—first position Ste of the slides 18, 19, 20 and 18', 19', 20' (FIGS. 1 and 3) in which case the intake point of the long suction pipes is situated at the mouths 21, 22, 23 and 21', 22', 23', and the charging of the cylinders is influenced essentially by gas-dynamic events in the individual suction pipes. In this operating condition, the compressional vibration is 0, which is illustrated by a line 36—in FIG. 1.

Figure 2:
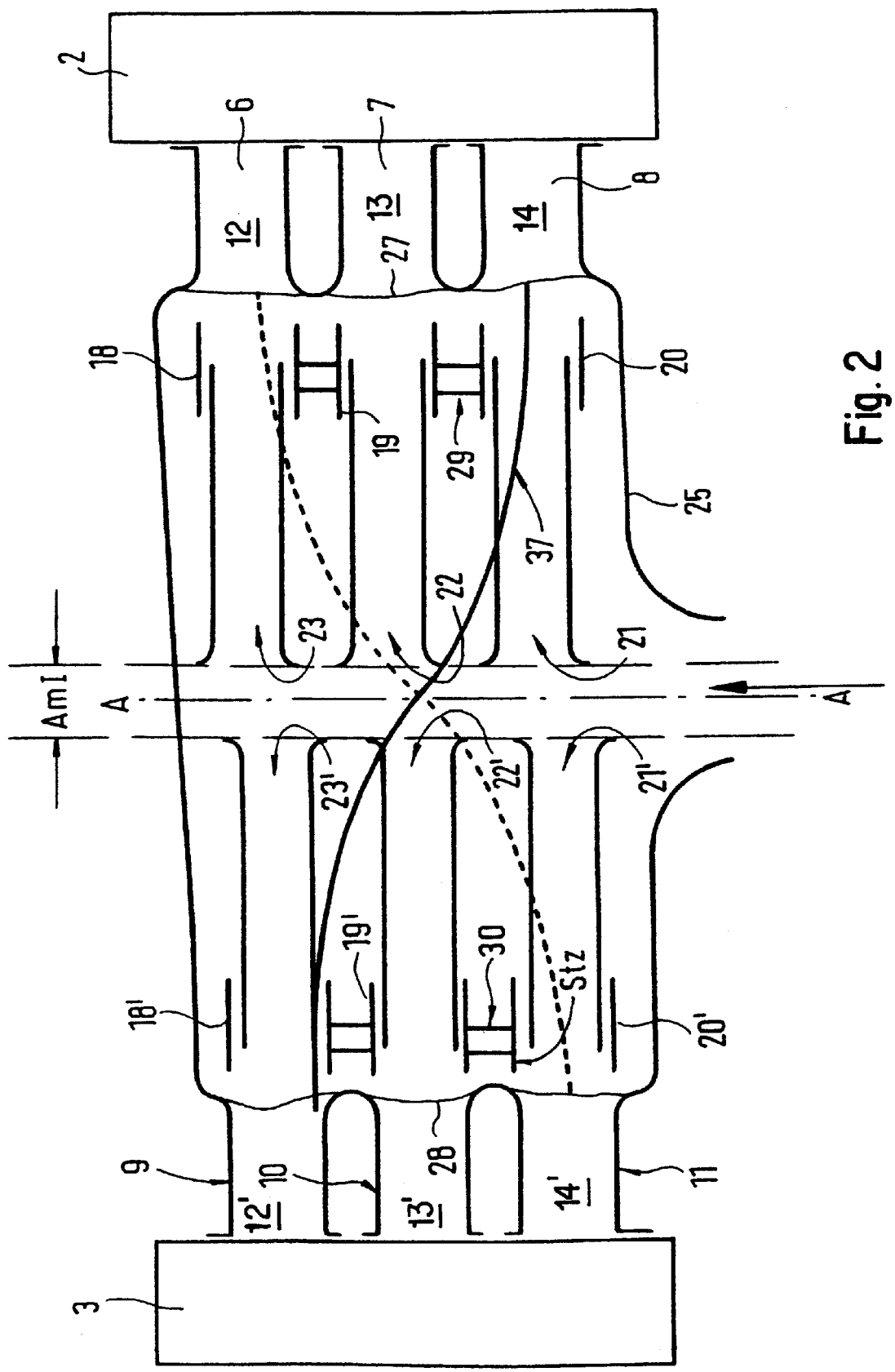
FIG. 2 is a view corresponding to FIG. 1.

If, in contrast, the slides 18, 19, 20 and 18', 19', 20' are in position Stz (FIGS. 2 and 4) upper rotational speed range approximately 5,000 to 7,000 r.p.m—, the intake point is displaced to the shorter sides 27, 28 of the resonance container 24, whereby the gas in the whole system is excited to carry out vibrations. As soon as the suction frequency approaches the natural system frequency (resonance case), an extremely good cylinder charge is achieved under these operating conditions. The level of the corresponding compressional vibrations is indicated by a solid line 37 and a broken line 38.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air intake system of a multi-cylinder internal-combustion engine, having two opposed cylinder rows, a resonance chamber system being arranged between the cylinder rows which is connected by means of suction pipes to cylinders of the cylinder rows and is connected by means of a feed pipe to an air filter, which resonance chamber system has first outer suction pipe sections and second inner suction pipe sections of the suction pipes, of which the inner suction pipe sections extend, on the one hand, by means of movable slides tithe outer suction pipe sections and are directed by means of mouths to a longitudinal center plane between the suction pipes, wherein the resonance chamber system has a single resonance container which is connected with the first outer suction pipe sections and the second inner suction pipe sections in which resonance container the second suction pipe sections for each cylinder row are arranged relatively movably with respect to a longitudinal center plane of the resonance container such that the second suction pipe sections operate by means of the slides in a first position in a long-pipe operation and in a second position in a short-pipe operation, and wherein, viewed from above, the resonance container has an approximately rectangular basic shape, the second suction pipe sections extending in a direction of longer sides of the resonance container.

2. Air intake system according to claim 1, wherein the ratio of the rectangular basic shape of the resonance container of the shorter sides to the longer sides amounts approximately to 1:1.5 to 2.

3. Air intake system according to claim 1, wherein a distance is provided between the mutually facing mouths of the second suction pipe sections.

4. Air intake system according to claim 1, wherein the slides of the second suction pipe sections of the two cylinder rows are each combined to a respective first constructional unit and a respective second constructional unit.

5. Air intake system according to claim 1, wherein the second suction pipe sections are connected in the first position with the pertaining first suction pipe sections, whereas, in the second position, a distance is provided between the first suction pipe sections and the second suction pipe sections.

6. Air intake system according to claim 5, wherein, in the first position, the slides interact by means of sealing bodies with the first suction pipe sections.

7. Air intake system having an air inlet according to claim 1, wherein an air inlet is provided on a longer side of the resonance container.

8. Air intake system according to claim 7, wherein the air inlet is provided in proximity of a longitudinal center plane of the resonance container.

9. Air intake system according to claim 7, wherein, a conduit is connected in front of the air inlet, in which conduit a throttle valve is provided.

10. Air intake system according to claim 1, wherein an air inlet is provided in proximity of a longitudinal center plane of the resonance container.

11. Air intake system according to claim 10, wherein, a conduit is connected in front of the air inlet, in which conduit a throttle valve is provided.

12. Air intake system according to claim 1, wherein a distance is provided between the mutually facing mouths of the second suction pipe sections.

13. An air intake resonance chamber system for an opposed cylinder row multi cylinder internal combustion engine, comprising:

a resonance chamber, a plurality of first air intake pipe sections in the resonance chamber, a plurality of tubular slides disposed on the respective first air intake pipe sections, and a slide control unit operable to move the tubular slides between a long pipe connection position with the first air intake pipe sections communicating directly with respective second air intake pipe sections leading to respective engine cylinders and a short pipe connection position spaced from the second air intake pipe sections, wherein, viewed from above, the resonance container has an approximately rectangular basic shape, the second suction pipe sections extending in a direction of longer sides of the resonance container.

14. A resonance chamber system according to claim 13, wherein said slide control unit is operable to move the slides to the long pipe connection position for engine operating speeds below a predetermined speed and to move the slides to the short pipe connection position for engine operating speeds above the predetermined speed.

15. Air intake system according to claim 14, wherein the predetermined speed is about 5,000 revolutions per minute.

16. A method of operating a multi-cylinder engine with opposed cylinder rows and an air intake system having:
- a resonance chamber,
- a plurality of first air intake pipe sections in the resonance chamber,
- a plurality of tubular slides disposed on the respective first air intake pipe sections,
- and a slide control unit operable to move the tubular slides between a long pipe connection position with the first air intake pipe sections communicating directly with respective second air intake pipe sections leading to respective engine cylinders and a short pipe connection position spaced from the second air intake pipe sections,
- said method comprising automatically operating the slide control unit to move the slides to the long pipe connection position during engine operating speeds below a predetermined speed and to move the slides to the short pipe connection position for engine operating speeds above the predetermined speed,
- wherein, viewed from above, the resonance container has an approximately rectangular basic shape, the second suction pipe sections extending in a direction of longer sides of the resonance container.

17. A method according to claim 16, wherein the predetermined speed is about 5,000 revolutions per minute.

18. Air intake system of a multi-cylinder internal-combustion engine, having two opposed cylinder rows, a resonance chamber system being arranged between the cylinder rows which is connected by respective suction pipes to cylinders of the cylinder rows and is connected by a feed pipe to an air filter, which resonance chamber system has first outer suction pipe sections and second inner suction pipe sections of the respective suction pipes which are coaxial And concentrically disposed with respect to one another, of which the respective inner suction pipe sections extend in the respective outer suction pipe sections and are directed by mouths to a longitudinal center plane between the suction pipes,
- wherein the resonance chamber system has a single resonance container which is connected with the respective first outer suction pipe sections and the respective second inner suction pipe sections, the second suction pipe sections for each cylinder row being arranged relatively movably with respect to a longitudinal center plane of the resonance container such that the respective suction pipe sections of each suction pipe are movable with respect to one another between a first position in a long-pipe operation and a second position in a short-pipe operation, and
- wherein, viewed from above, the resonance container has an approximately rectangular basic shape, the second suction pipe sections extending in a direction of longer sides of the resonance container.

19. An air intake resonance chamber system for an opposed cylinder row multi cylinder internal combustion engine, comprising:
- a resonance chamber,
- a plurality of respective first air intake pipe sections in the resonance chamber,
- a plurality of respective tubular slides concentrically surrounding respective ones of the first air intake pipe sections, and
- a slide control unit operable to move the tubular slides between a long pipe connection position with the first air intake pipe sections communicating directly with respective second air intake pipe sections leading to respective engine cylinders and a short pipe connection position spaced from the second air intake pipe sections, and
- wherein, viewed from above, the resonance container has an approximately rectangular basic shape, the second suction pipe sections extending in a direction of longer sides of the resonance container.

20. A resonance chamber system according to claim 20, wherein said slide control unit is operable to move the slides to the long pipe connection position for engine operating speeds below a predetermined speed and to move the slides to the short pipe connection position for engine operating speeds above the predetermined speed.

21. Air intake system according to claim 20, wherein the predetermined speed is about 5,000 revolutions per minute.

22. A method of operating a multi cylinder engine with opposed cylinder rows and an air intake system having:
- a resonance chamber,
- a plurality of respective first air intake pipe sections in the resonance chamber,
- a plurality of respective tubular slides disposed concentrically surrounding ones of the respective first air intake pipe sections, and
- a slide control unit operable to move the tubular slides between a long pipe connection position with the first air intake pipe sections communicating directly with respective second air intake pipe sections leading to respective engine cylinders and a short pipe connection position spaced from the second air intake pipe sections,
- said method comprising automatically operating the slide control unit to move the slides to the long pipe connection position during engine operating speeds below a predetermined speed and to move the slides to the short pipe connection position for engine operating speeds above the predetermined speed,
- wherein, viewed from above, the resonance container has an approximately rectangular basic shape, the second suction pipe sections extending in a direction of longer sides of the resonance container.

23. A method according to claim 22, wherein the predetermined speed is about 5,000 revolutions per minute.

24. Air intake system of a multi-cylinder internal-combustion engine, having two opposed cylinder rows, a resonance chamber system being arranged between the cylinder rows which is connected by means of suction pipes to cylinders of the cylinder rows and is connected by means of a feed pipe to an air filter, which resonance chamber system has first outer suction pipe sections and second inner suction pipe sections of the suction pipes, of which the inner suction pipe sections extend, on the one hand, by means of movable slides to the outer suction pipe sections and are directed by means of mouths to a longitudinal center plane between the suction pipes,
- wherein the resonance chamber system has a single resonance container which is connected with the first outer suction pipe sections and the second inner suction pipe sections in which resonance container the second suction pipe sections for each cylinder row are arranged relatively movably with respect to a longitudinal center plane of the resonance container such that the second suction pipe sections operate by means of the slides in a first position in a long-pipe operation and in a second position in a short-pipe operation, and wherein the ratio of the rectangular basic shape of the resonance container of the shorter sides to the longer sides amounts approximately to 1:1.5 to 2.

25. Air intake system of a multi-cylinder internal-combustion engine, having two opposed cylinder rows, a resonance chamber system being arranged between the cylinder rows which is connected by means of suction pipes to cylinders of the cylinder rows and is connected by means of a feed pipe to an air filter, which resonance chamber system has first outer suction pipe sections and second inner suction pipe sections of the suction pipes, of which the inner suction pipe sections extend, on the one hand, by means of movable slides to the outer suction pipe sections and are directed by means of mouths to a longitudinal center plane between the suction pipes, wherein the resonance chamber system has a single resonance container which is connected with the first outer suction pipe sections and the second inner suction pipe sections in which resonance container the second suction pipe sections for each cylinder row are arranged relatively movably with respect to a longitudinal center plane of the resonance container such that the second suction pipe sections operate by means of the slides in a first position in a long-pipe operation and in a second position in a short-pipe operation, and wherein a distance is provided between the mutually facing mouths of the second suction pipe sections.

26. Air intake system of a multi-cylinder internal-combustion engine, having two opposed cylinder rows, a resonance chamber system being arranged between the cylinder rows which is connected by means of suction pipes to cylinders of the cylinder rows and is connected by means of a feed pipe to an air filter, which resonance chamber system has first outer suction pipe sections and second inner suction pipe sections of the suction pipes, of which the inner suction pipe sections extend, on the one hand, by means of movable slides to the outer suction pipe sections and are directed by means of mouths to a longitudinal center plane between the suction pipes, wherein the resonance chamber system has a single resonance container which is connected with the first outer suction pipe sections and the second inner suction pipe sections in which resonance container the second suction pipe sections for each cylinder row are arranged relatively movably with respect to a longitudinal center plane of the resonance container such that the second suction pipe sections operate by means of the slides in a first position in a long-pipe operation and in a second position in a short-pipe operation, and wherein the slides of the second suction pipe sections of the two cylinder rows are each combined to a respective first constructional unit and a respective second constructional unit.

27. Air intake system of a multi-cylinder internal-combustion engine, having two opposed cylinder rows, a resonance chamber system being arranged between the cylinder rows which is connected by means of suction pipes to cylinders of the cylinder rows and is connected by means of a feed pipe to an air filter, which resonance chamber system has first outer suction pipe sections and second inner suction pipe sections of the suction pipes, of which the inner suction pipe sections extend, on the one hand, by means of movable slides to the outer suction pipe sections and are directed by means of mouths to a longitudinal center plane between the suction pipes, wherein the resonance chamber system has a single resonance container which is connected with the first outer suction pipe sections and the second inner suction pipe sections in which resonance container the second suction pipe sections for each cylinder row are arranged relatively movably with respect to a longitudinal center plane of the resonance container such that the second suction pipe sections operate by means of the slides in a first position in a long-pipe operation and in a second position in a short-pipe operation, and wherein the second suction pipe sections are connected in the first position with the pertaining first suction pipe sections, whereas, in the second position, a distance is provided between the first suction pipe sections and the second suction pipe sections.

28. Air intake system according to claim 27, wherein, in the first position, the slides interact by means of sealing bodies with the first suction pipe sections.

29. Air intake system of a multi-cylinder internal-combustion engine, having two opposed cylinder rows, a resonance chamber system being arranged between the cylinder rows which is connected by means of suction pipes to cylinders of the cylinder rows and is connected by means of a feed pipe to an air filter, which resonance chamber system has first outer suction pipe sections and second inner suction pipe sections of the suction pipes, of which the inner suction pipe sections extend, on the one hand, by means of movable slides to the outer suction pipe sections and are directed by means of mouths to a longitudinal center plane between the suction pipes, wherein the resonance chamber system has a single resonance container which is connected with the first outer suction pipe sections and the second inner suction pipe sections in which resonance container the second suction pipe sections for each cylinder row are arranged relatively movably with respect to a longitudinal center plane of the resonance container such that the second suction pipe sections operate by means of the slides in a first position in a long-pipe operation and in a second position in a short-pipe operation, and wherein a distance is provided between the mutually facing mouths of the second suction pipe sections.

* * * * *